(12) United States Patent
Mogamiya

(10) Patent No.: US 6,272,290 B1
(45) Date of Patent: Aug. 7, 2001

(54) CAMERA SYSTEM

(75) Inventor: Makoto Mogamiya, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/333,663

(22) Filed: Jun. 16, 1999

(30) Foreign Application Priority Data

Jun. 19, 1998 (JP) .................................................. 10-172719

(51) Int. Cl.[7] .............................. G03B 19/00; G03B 43/00
(52) U.S. Cl. ........................... 396/59; 396/333; 396/429; 348/64
(58) Field of Search .................................. 396/322, 325, 396/333, 429, 59; 348/64

(56) References Cited

U.S. PATENT DOCUMENTS

| | | | |
|---|---|---|---|
| 4,462,666 | * | 7/1984 | Orban ..................................... 396/62 |
| 4,825,290 | * | 4/1989 | Iida ....................................... 396/429 |
| 4,920,371 | * | 4/1990 | Kaneko ................................. 396/189 |
| 5,307,168 | * | 4/1994 | Tashiro ................................. 348/64 |
| 5,434,614 | * | 7/1995 | Dainty ................................... 348/64 |
| 5,546,121 | * | 8/1996 | Gotanda et al. ....................... 348/64 |
| 5,777,667 | * | 7/1998 | Miyake et al. ........................ 348/64 |

* cited by examiner

*Primary Examiner*—David M. Gray
(74) *Attorney, Agent, or Firm*—Greenblum & Bernstein, P.L.C.

(57) ABSTRACT

A camera system comprises a silver halide film camera, by which an object image is recorded on a silver halide film, and a digital camera, by which an object image is recorded in a CCD. The silver halide film camera has a first release button, a first zoom lever, and a light receiving unit. The digital camera has a second release button, a second zoom lever, and an infra-red light beam emitting diode. In a normal mode, by manually operating the first release button and the first zoom lever, a photographing operation and a zooming operation of the silver halide film camera are performed. In a remote control mode, by manually operating the first release button and the first zoom lever, a photographing operation and a zooming operation of the digital camera are performed. At this time, an infra-red light beam is radiated from the infra-red light beam emitting diode, so that a photographing operation and a zooming operation are performed in the silver halide film camera.

17 Claims, 17 Drawing Sheets

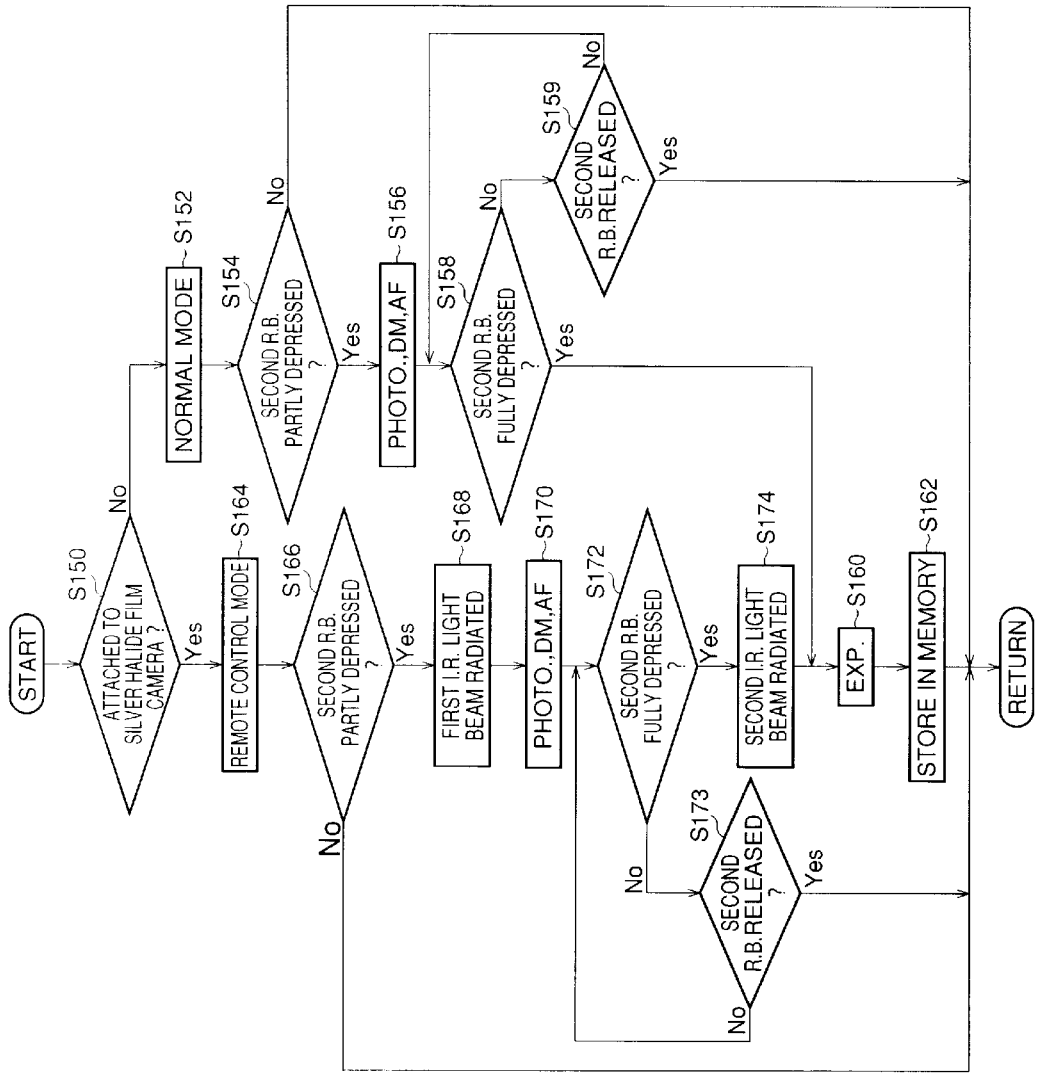

CAMERA SYSTEM

BACKGROUND OF THE INVENTION

1. Field of the Invention

The present invention relates to a camera system that allows an object image to be simultaneously recorded on a silver halide film and in an electronic recording medium.

2. Description of the Related Art

Conventionally, there is known a digital camera by which an object image, taken by a photographing optical system, is converted into an electrical signal and is recorded in a recording medium. In the digital camera, the object image, which has been electrically recorded, can be observed through a monitor immediately after the recording operation, and can be easily processed by a personal computer.

On the other hand, in a silver halide film camera, an object image is recorded on a silver halide film, and is visualized by developing the film. The object image, obtained by the silver halide film camera, has a higher quality than that obtained by the digital camera.

Recently, a camera system, in which the digital camera is attached to the silver halide film camera, so that an object image can be recorded simultaneously on a silver halide film and in an electronic recording medium, has been proposed.

In the camera system, however, it is necessary to synchronize a photographing operation of the digital camera and a photographing operation of the silver halide film camera, so that an object image can be simultaneously recorded. Accordingly, in a conventional camera system, the silver halide film camera is required to have an electrical contact for connecting the digital camera thereto and, consequently, this necessitates a drastic change in a design of the silver halide film camera.

SUMMARY OF THE INVENTION

Therefore, an object of the present invention is to provide a camera system in which a digital camera is detachably mountable to a silver halide film camera having a design which is not substantially different to a conventional sliver halide film camera to which the digital camera cannot be attached.

According to the present invention, there is provided a camera system by which an object image is recordable on a silver halide film and in an electronic recording medium, the camera system comprising a silver halide film camera and a digital camera.

The silver halide film camera has a film recording device to record the object image on the silver halide film, and a signal receiving device that receives an operation control signal so that the silver halide film camera is operated. The digital camera has a digital recording device to electronically record the object image in the electronic recording medium, and a signal output device that outputs the operation control signal to the silver halide film camera. The operation control signal is received by the signal receiving device when the digital camera is attached to the silver halide film camera.

Further, according to the present invention, there is provided a camera system by which an object image can be recorded on a silver halide film and in an electronic recording medium, the camera system comprising a silver halide film camera and a digital camera.

The silver halide film camera has a film recording device to record the object image on the silver halide film, and a signal receiving device, which receives a remote control signal output by a remote controller. The silver halide film camera is controllable by the remote control signal. The digital camera has a digital recording device to electronically record the object image in the electronic recording medium, and a signal output device that outputs an operation control signal by which the silver halide film camera is controlled, when the digital camera is attached to the silver halide film camera.

Furthermore, according to the present invention, there is provided a digital camera detachably attachable to a silver halide film camera in which an object image is recordable on a silver halide film, the digital camera comprising a digital recording device and a signal output device.

The digital recording device electronically records the object image in an electronic recording medium. The signal output device optically transmits a control signal to the silver halide film camera, so that the object image is recorded in the silver halide film simultaneously with an operation of the digital recording device.

BRIEF DESCRIPTION OF THE DRAWINGS

The objects and advantages of the present invention will be better understood from the following description, with reference to the accompanying drawings in which:

FIG. 7 shows a flowchart of a photographing process routine executed in the digital camera;

DESCRIPTION OF THE PREFERRED EMBODIMENTS

Figure 1:
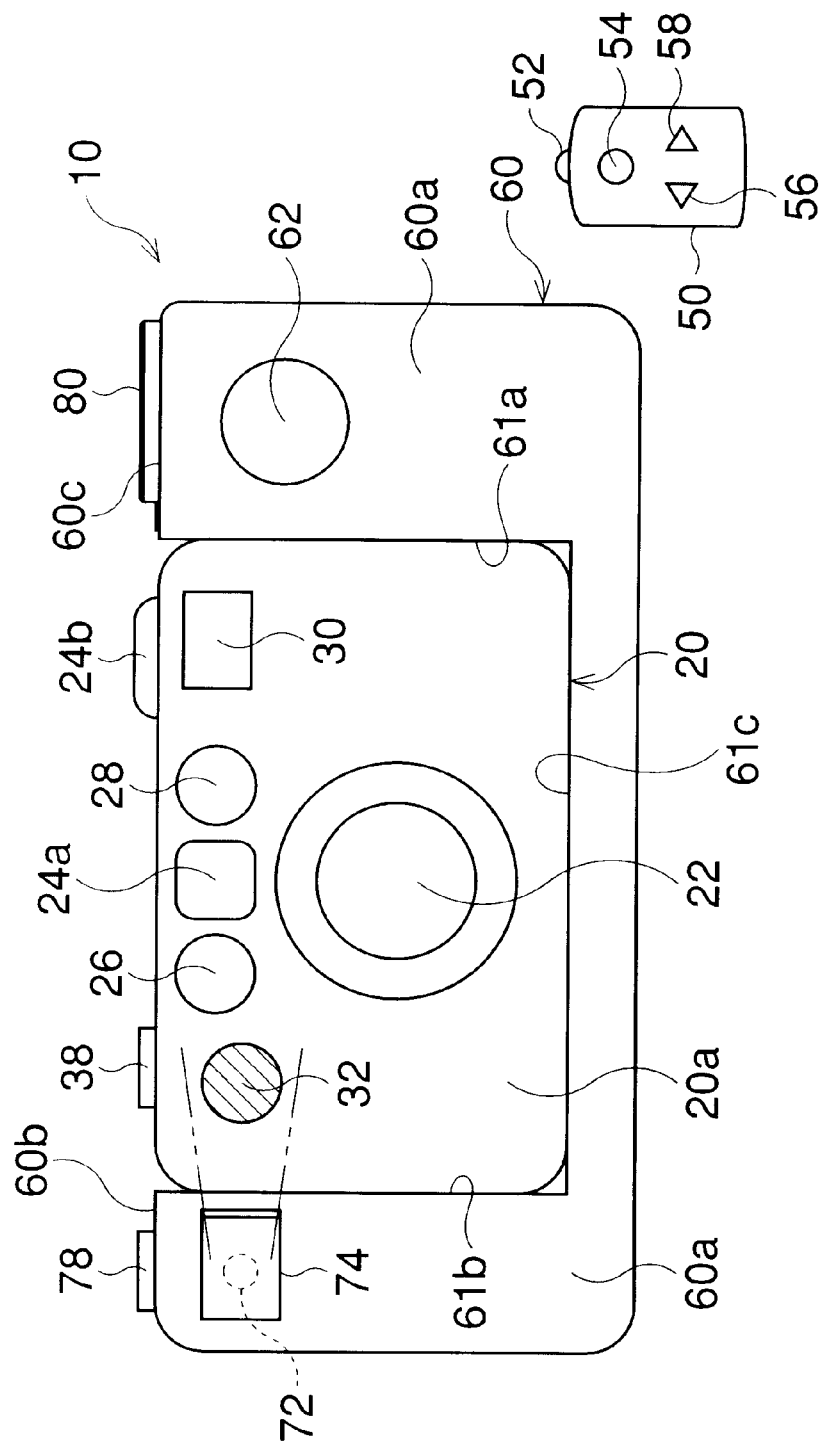
FIG. 1 is a front view showing a camera system of a first embodiment of the present invention.

The present invention will be described below with reference to embodiments shown in the drawings.

Figure 2:
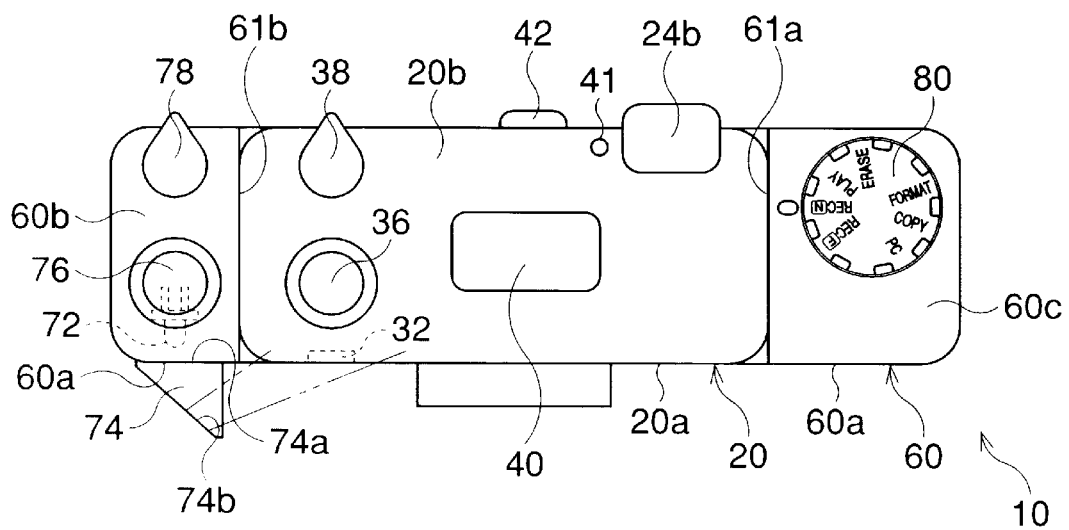
FIG. 2 is a plan view of the camera system shown in FIG. 1.
Figure 3:
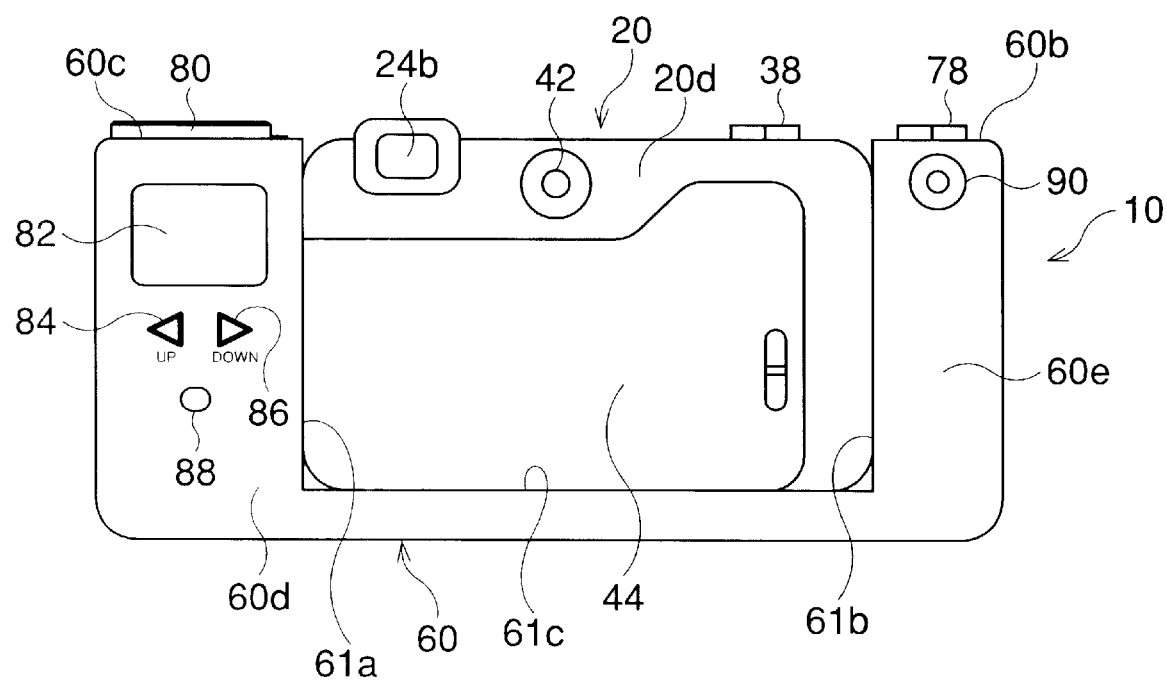
FIG. 3 is a rear view of the camera system shown in FIG. 2.

FIGS. 1 through 3 show a camera system to which a first embodiment of the present invention is applied.

A camera system 10 has a silver halide film camera 20 and a digital camera 60. The silver halide film camera 20 is approximately rectangularly parallelepiped, and the digital camera 60 has a recess, having side walls 61a and 61b and a bottom wall 61c, in which the silver halide film camera 20 is securely mountable. If required, the silver halide film camera 20 and the digital camera 60 can be separated and used independently.

The silver halide film camera 20 is operable by a remote control signal output by a remote controller 50, which is located separately from the silver halide film camera 20. The digital camera 60 is fixably attached to the silver halide film camera 20 by a manually tightened screw (not shown) provided through the bottom surface 61c of the digital camera 60.

When the digital camera 60 is attached to the silver halide film camera 20, as shown in the drawings, a front surface 60a of the digital camera 60 is coplanar with a front surface 20a of the silver halide film camera 20. A photographing optical system 62 of the digital camera 60 is provided on the front surface 60a. An object image, taken by the photographing optical system 62, is formed on a light receiving surface of a CCD (not shown). A photographing optical system 22 is provided on a front surface 20a of the silver halide film camera 20. An object image taken by the photographing optical system 22, is formed on a silver halide film (not shown) mounted in the silver halide film camera 20. When the digital camera 60 is attached to the silver halide film camera 20, the optical axes of the photographing optical systems 22 and 62 are parallel to each other.

On the front surface 20a of the silver halide film camera 20, a view finder 24a is disposed above the photographing optical system 22. Light passing through the view finder 24a is led to an eyepiece window 24b provided in a rear surface 20d of the silver halide film camera 20, and thus an object image can be observed by a user through the eyepiece window 24b. Further, on the front surface 20a, an electronic flash 30 is provided on an upper-right portion thereof, and a light emitting unit 26 and a light receiving unit 28, which are used in a distance measurement operation, are provided on opposite sides, respectively, of the view finder 24a.

A light receiving unit 32 for the remote controller 50 is disposed at an upper-left portion of the front surface 20a. The silver halide film camera 20 can be operated in a remote control mode by an infra-red light beam, radiated by manually operating the remote controller 50, being detected by the light receiving unit 32.

An infra-red light beam emitting diode 72 and a prism 74 are disposed at an upper-left portion of the front surface 60a of the digital camera 60. An infra-red light beam is radiated from the infra-red light beam emitting diode 72 in a direction parallel to the optical axes of the photographing optical systems 22 and 62. The infra-red light beam (i.e., an operation control signal) is a pulsed beam, a pulse-width of which is changed in accordance with a command signal output by the digital camera 60.

The prism 74 is a trigonal prism as shown in FIG. 2, and a side surface 74a of the prism 74 is fixed on a left side of the front surface 60a. On the front surface 60a, the prism 74 is positioned to cover the infra-red light beam emitting diode 72, so that an infra-red light beam emitted from the infra-red light beam emitting diode 72 is reflected by a side surface 74b, which is inclined to the front surface 60a, and enters the light receiving unit 32. Thus, the infra-red light beam output by the infra-red light beam emitting diode 72 is radiated on the light receiving unit 32 through the prism 74, and thus the operation control signal is optically transmitted to the silver halide film camera 20, as described later.

In a state in which the digital camera 60 is attached to the silver halide film camera 20, the silver halide film camera 20 can be operated by the digital camera 60 when the infra-red light beam (i.e., the operation control signal) radiated by the infra-red light beam emitting diode 72 is sensed by the light receiving unit 32.

A first release button 36, a first zoom lever 38, a liquid crystal display (LCD) panel 40 and a remote control setting button 41 are provided on an upper surface 20b of the silver halide film camera 20.

When the remote control mode is not set in the silver halide film camera 20, i.e., when a normal mode is set, a photometry operation and an automatic focusing adjustment are carried out by partly depressing the first release button 36, and a photographing operation is carried out by fully depressing the first release button 36.

When the normal mode is set, a zooming operation of the silver halide film camera 20 is carried out by manually operating the first zoom lever 38. Namely, by rotating the first zoom lever 38, the first photographing optical system 22 is zoomed in a telephoto direction, in which a magnification of an object image is increased, or in a wide-angle direction, in which the magnification is decreased.

A setting condition of the silver halide film camera 20 is indicated by the LCD panel 40. The remote control setting button 41 is provided for changing between the normal mode, operations of which are controlled by the first release button 36 and the first zoom lever 38 of the silver halide film camera 20, and the remote control mode, operations of which are controlled by the remote controller 50. The mode set by the button 41 is indicated by the LCD panel 40.

The remote controller 50 is provided with an infra-red light beam emitting diode 52, a remote control release button 54, a telephoto zoom key 56 and wide-angle zoom key 58. The remote control release button 54 has the same function as that of the first release button 36, and when depressing the remote control release button 54, an infra-red light beam, indicating that the remote control release button 54 is depressed, is emitted by the infra-red light beam emitting diode 52. By the light receiving unit 32 sensing the infra-red light beam, a photographing operation is performed in the silver halide film camera 20.

A combined function of the telephoto zoom key 56 and the wide-angle zoom key 58 is equivalent to the function of the first zoom lever 38, and when the telephoto zoom key 56 and the wide-angle zoom key 58 are depressed, an appropriate infra-red light beam, indicating that the key 56 or key 58 is depressed, is emitted by the infra-red light beam emitting diode 52. Thus, a zooming operation in a telephoto direction or a wide-angle direction is performed in the silver halide film camera 20.

When the remote control mode is set, the first release button 36 and the first zoom lever 38 are locked and become inoperable, and the remote control release button 54, the telephoto zoom key 56 and the wide-angle zoom key 58 become effective. Note that, in the remote control mode, the silver halide film camera 20 can be operated by the digital camera 60, as well as by the operation of the remote controller 50.

A second release button 76 is disposed on a left upper surface 60b of the digital camera 60. When the second release button 76 is manually operated in the normal mode, a digital photographing operation of only the digital camera 60 is carried out, and when the second release button 76 is manually operated in the remote control mode, photographing operations of both of the silver halide film camera 20 and the digital camera 60 are simultaneously carried out.

On the upper surface 60b, a second zoom lever 78 is provided close to the release button 76. When the second zoom lever 78 is manually operated in the normal mode, a zooming operation of only the second photographing optical system 62 is carried out, and when the second zoom lever 78 is manually operated in the remote control mode, zooming operations of both of the first and second photographing optical systems 22 and 62 are simultaneously carried out.

A mode setting dial 80 is provided on a right upper surface 60c of the digital camera 60. By rotating the mode setting dial 80, one of seven modes, including a format mode (FORMAT), a copy mode (COPY), an output mode (PC), a fine record mode (REC-F), a normal record mode (REC-N), a play mode (PLAY) and an erase mode (ERASE), is set in the digital camera 60.

Direction keys 84, 86 and a selection key 88 are provided on a rear surface 60d of the digital camera 60. A monitor 82 is disposed on the rear surface 60d, so that a movie (real-time) image, obtained through the CCD, and a still image, stored in a memory (not shown) provided in the digital camera 60, can be indicated by the monitor 82. By operating the keys 84, 86 and 88, a still image indicated on the monitor 82 is selectable.

An electric power button 90 of the digital camera 60 is provided on a rear surface 60e of the digital camera 60, and an electric power button 42 of the silver halide film camera 20 is provided on the rear surface 20d of the silver halide film camera 20. A back cover 44 is provided on the rear surface 20d, and can open and close an opening formed in the silver halide film camera 20. When the back cover 44 is open, a silver halide film, i.e., a 35 mm film held in a magazine or patrone, is mounted in a predetermined position in the silver halide film camera 20.

Figure 4:
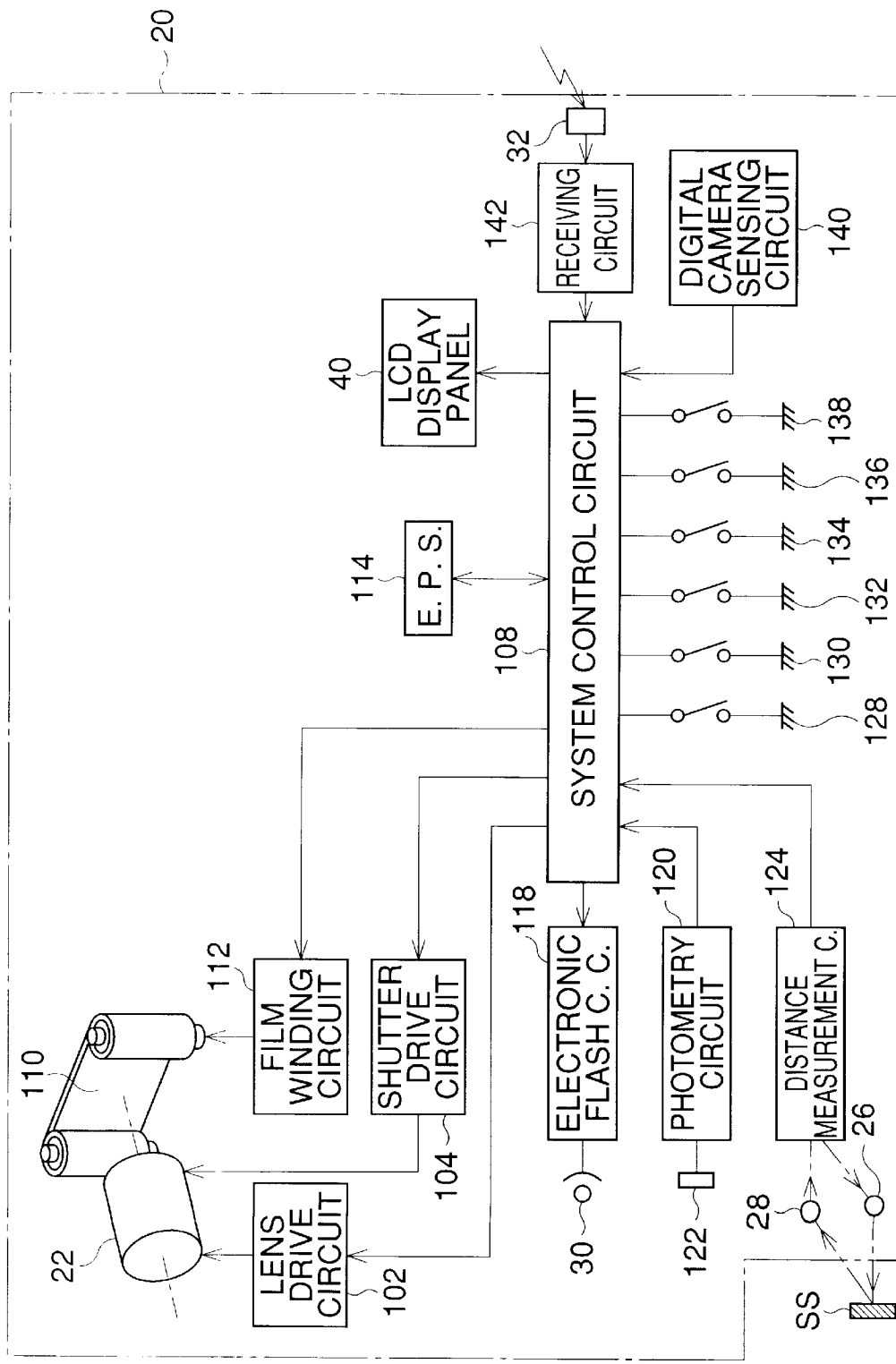
FIG. 4 is a block diagram showing a circuit of a silver halide film camera shown in FIG. 1.

FIG. 4 is a block diagram showing a circuit of the silver halide film camera 20. A lens drive circuit 102 and a shutter drive circuit 104 are connected to the first photographing optical system 22. These circuits 102 and 104 are controlled by a first system control circuit 108 to perform a zooming operation, an automatic focusing adjustment, and an automatic exposure control of the first photographing optical system 22. A film 110 is disposed behind the first photographing optical system 22, and thus an object image is formed and recorded on the film 110. A take-up and a rewinding of the film 110 is carried out by a film winding circuit 112.

An electric power supply 114 and the LCD panel 40 are connected to the first system control circuit 108, and the electronic flash 30 is connected to the first system controller 108 through an electronic flash control circuit 118. Based on a luminance of an object SS, which is to be photographed, obtained through a photometry sensor 122 and a photometry circuit 120, an exposure is controlled by the first system control circuit 108. A distance measurement circuit 124 is also connected to the first system control circuit 108. Thus, due to an operation of the distance measurement circuit 124, an infra-red light beam radiated from the light emitting unit 26 is reflected by the object SS, and is received by the light receiving unit 28, so that an object distance from the camera 20 to the object SS is sensed. Based on the object distance, a focal length of the first photographing optical system 22 is controlled by the first system control circuit 108.

Switches 128, 130, 132, 134, 136 and 138, which are ON-OFF controlled by the operator, are connected to the first system control circuit 108. An ON-OFF condition of the power switch 128 is changed by depressing the electric power button 42. The photometry and distance measurement switch 130 and the release switch 132 are normally turned OFF. When it is sensed that the first or second release button 36 or 76 is partly depressed, the photometry and distance measurement switch 130 is turned ON, and thus a photometry operation and an automatic focusing adjustment are performed. When it is sensed that the first or second release button 36 or 76 is fully depressed, the release switch 132 is turned ON, and thus an exposure is carried out.

The telephoto switch 134 and the wide-angle switch 136 are controlled in accordance with a rotating operation of the zoom lever 38. Namely, the telephoto switch 134 is turned ON when the zoom lever 38 is rotated in a clockwise direction when viewing the camera system from the upper surface 20b, and the wide-angle switch 136 is turned ON when the zoom lever 38 is rotated in a counterclockwise direction when viewing the camera system from the upper surface 20b. The first system control circuit 108 controls the lens drive circuit 102 to perform a zooming operation in the telephoto direction or the wide-angle direction, every time an ON state of the telephoto switch 134 or the wide-angle switch 136 is sensed. The remote control switch 138 corresponds to the remote control setting button 41. Namely, the remote control switch 138 is turned ON or OFF when the remote control setting button 41 is depressed, so that the normal mode and remote control mode are alternately changed.

It is sensed by a digital camera sensing circuit 140 whether the digital camera 60 is attached to the silver halide film camera 20. The light receiving unit 32 has an infra-red light beam sensor (not shown), so that an infra-red light beam, output by the infra-red light beam emitting diode 52 provided in the remote controller 50, or by the infra-red light beam emitting diode 72 provided in the digital camera 60, is sensed by the light receiving unit 32. In a receiving circuit 142, receiving data is generated based on the infra-red light beam sensed by the light receiving unit 32, and is output to the first system control circuit 108.

Figure 5:
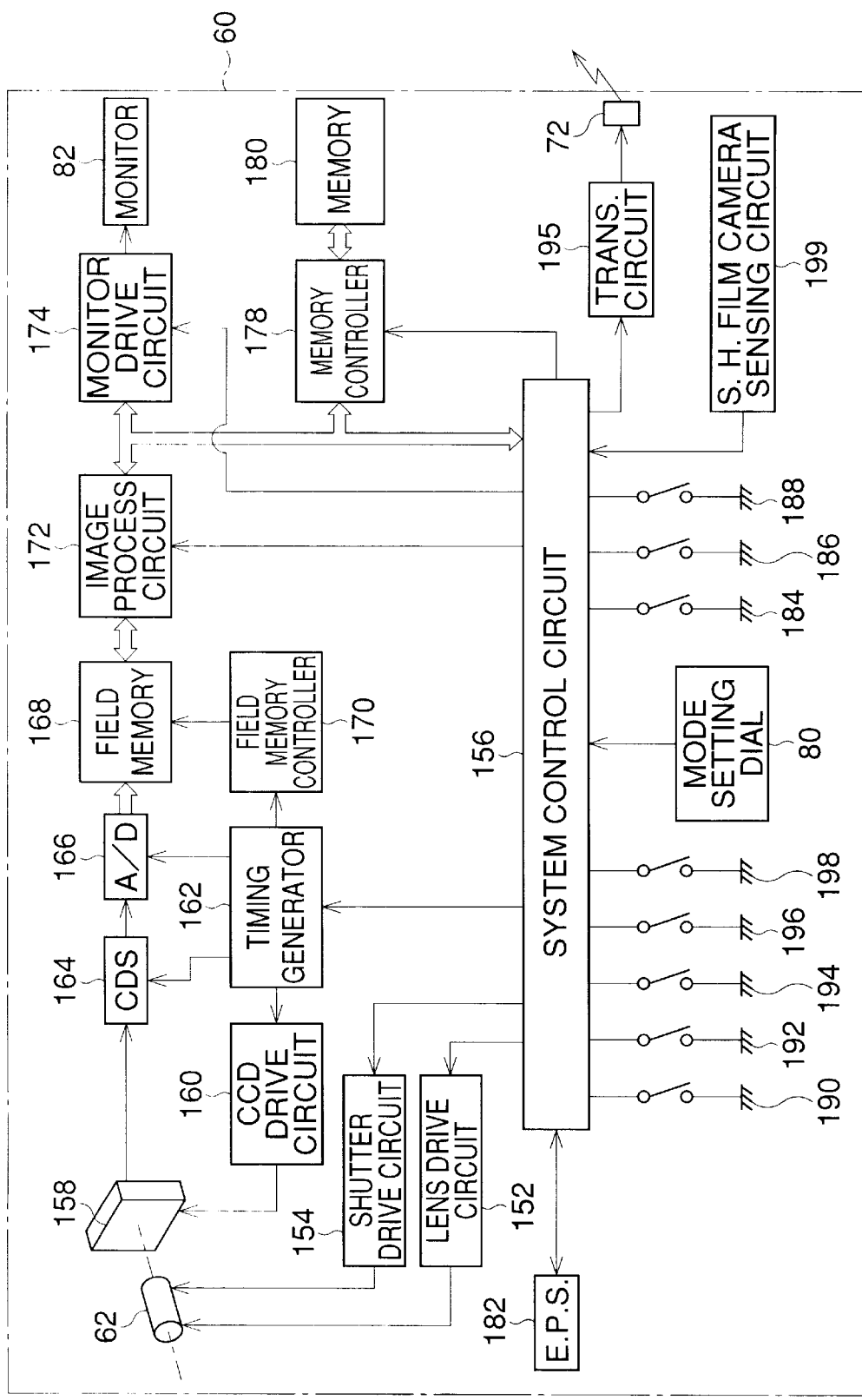
FIG. 5 is a block diagram showing a circuit of a digital camera shown in FIG. 1.

FIG. 5 is a block diagram showing a circuit of the digital camera 60. A lens drive circuit 152 and a shutter drive circuit 154 are connected to the second photographing optical system 62. These circuits 152 and 154 are controlled by a second system control circuit 156. A zooming operation of the second photographing optical system 62 is carried out by the lens drive circuit 152, and an automatic exposure control is carried out by the shutter drive circuit 154.

A CCD 158 is disposed behind the second photographing optical system 62, and thus an object image taken by the second photographing optical system 62 is formed on the CCD 158. The CCD 158 is driven by a CCD drive circuit 160, which is controlled based on a synchronizing signal output by a timing generator 162. The timing generator 162 is controlled by the second system control circuit 156.

An image signal output from the CCD 158 is subjected to a process performed by a correlated double sampling (CDS) circuit 164, so that a noise component is removed from the image signal. Then, the image signal is A/D converted to digital image data by an A/D converter 166, and is stored in a field memory 168, which has a capacity to store image data corresponding to a single image, and which is controlled by a field memory controller 170. The CDS circuit 164, the A/D converter 166 and the field memory controller 170 are controlled based on a signal output by the timing generator 162.

The image data stored in the field memory 168 is read therefrom, and is subjected to predetermined processes, such as a gamma correction and a shading correction, in an image process circuit 172. Then, in a monitor drive circuit 174, a synchronizing signal and other signals are added to the image data to generate a video signal, which is output to the monitor 82 such as a liquid crystal display. The object image is reproduced on a surface of the monitor 82 based on the video signal. Note that the image process circuit 172 and the monitor drive circuit 174 are controlled by the second system control circuit 156.

On the other hand, in an image recording operation, the image data, which has been subjected to the image processes by the image process circuit 172, is compressed by the second system control circuit 156, and is stored in a memory 180 driven by a memory controller 178. The image data stored in the memory 180 is read therefrom by the memory controller 178, and is reproduced by the monitor 82.

An electric power supply 182, the mode setting dial 80, an up-switch 184, a down-switch 186 and a select switch 188 are connected to the second system control circuit 156. The up-switch 184, the down-switch 186 and the select switch 188 correspond to the direction keys 84, 86 and the selection key 88, respectively, and are respectively turned ON when the keys 84, 86 and 88 are depressed.

A power switch 190, a photometry and distance measurement switch 192, a release switch 194, a telephoto switch 196 and a wide-angle switch 198 are connected to the second system control circuit 156. These switches 190, 192, 194, 196 and 198 have basically the same functions as those of the power switch 128, the photometry and distance measurement switch 130, the release switch 132, the telephoto switch 134 and the wide-angle switch 136, respectively, and therefore the descriptions of the common constructions are omitted here.

When the second release button 76 is partly depressed, the photometry and distance measurement switch 192 is turned ON, so that a photometry operation and a distance measurement are carried out, and a first infra-red light beam, indicating that the second release button 76 is partly depressed, is output from the infra-red light beam emitting diode 72 by a transmitting circuit 195. Similarly, when the second release button 76 is fully depressed, the release switch 194 is turned ON, so that a recording operation is carried out, and a second infra-red light beam, indicating that the second release button 76 is fully depressed, is output from the infra-red light beam emitting diode 72 by the transmitting circuit 195.

When the second zoom lever 78 is operated, the lens drive circuit 152 is controlled by the second system control circuit 156 to perform a zooming operation of the second photographing optical system 62 in the telephoto direction or the wide-angle direction. Consequently, the transmitting circuit 195 is controlled so that a third infra-red light beam, indicating that a zooming in the telephoto direction is being carried out, or a fourth infra-red light beam, indicating that a zooming in the wide-angle direction is being carried out, is output from the infra-red light beam emitting diode 72, every time an ON state of the telephoto switch 196 or the wide-angle switch 198 is sensed.

A silver halide film camera sensing circuit 199 is provided for sensing whether the digital camera 60 is attached to the silver halide film camera 20.

Figure 6:
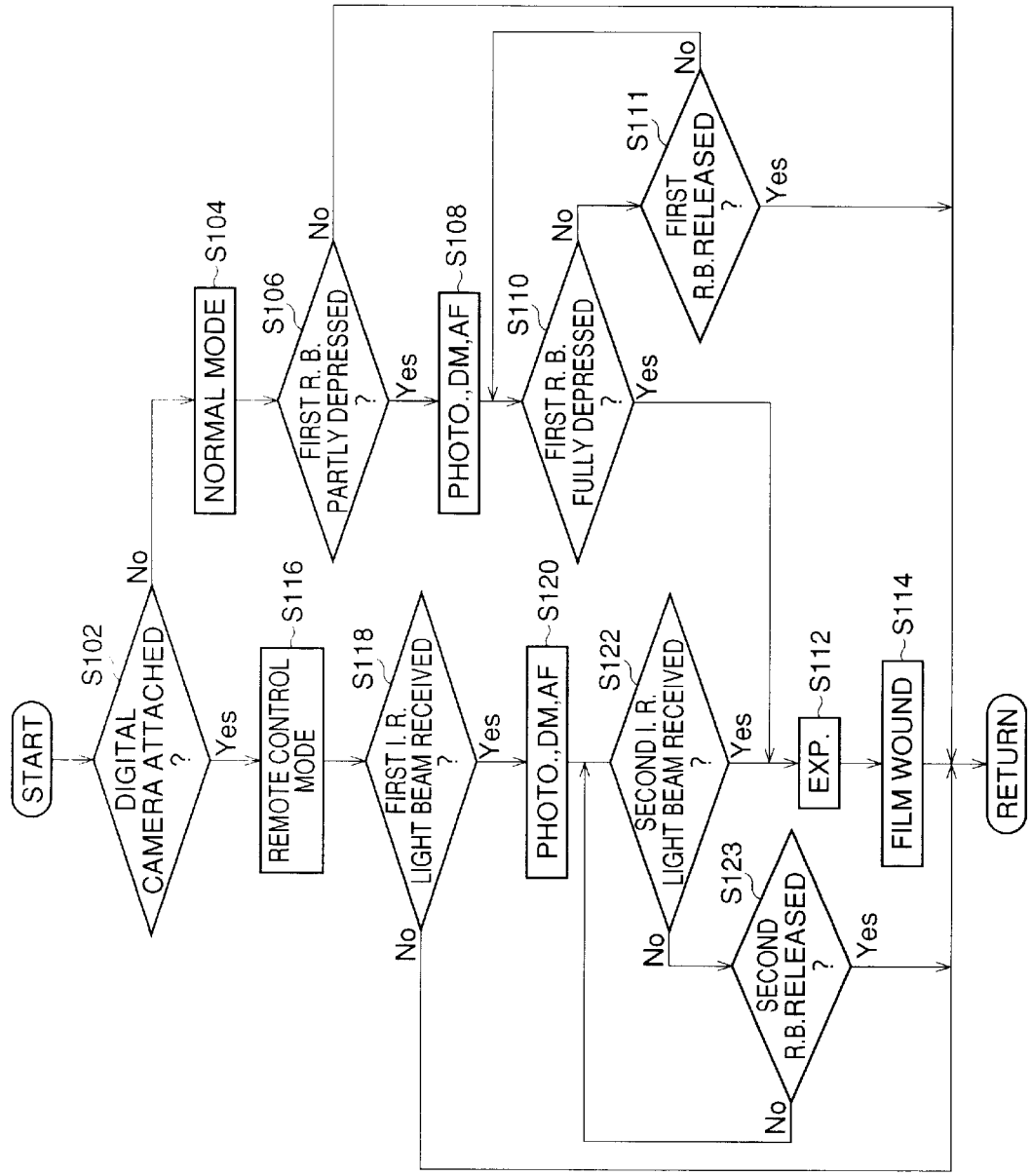
FIG. 6 is a flowchart of a photographing process routine executed in the silver halide film camera.

FIG. 6 shows a flowchart of a photographing process routine executed in the first system control circuit 108 of the silver halide film camera 20. Note that, when the silver halide film camera 20 is separated from and operated independently of the digital camera 60, the normal mode is always set in Step S102 as described below, regardless of the setting condition of the remote control setting button 41.

The photographing process routine is started by supplying electric power to the silver halide film camera 20. First, in Step S102, it is determined whether the digital camera sensing circuit 140 senses that the digital camera 60 is attached to the silver halide film camera 20. When it is sensed that the digital camera 60 is attached, Step S116 is executed in which the remote control mode is set in the silver halide film camera 20, and Step S118 is then executed. Note that, in Step S102, the first release button 36 is locked to become inoperable. Conversely, when it is sensed in Step S102 that the digital camera 60 is not attached, Step S104 is executed in which the normal mode is set in the silver halide film camera 20, and Step S106 is then executed.

In Step S106, it is determined whether the first release button 36 is partly depressed, i.e., whether the switch 130 is turned ON. When it is determined that the first release button 36 is partly depressed, Step S108 is executed, in which a photometry operation is carried out by the photometry circuit 120 and a distance measurement is carried out by the distance measurement circuit 124, and thus an automatic focusing adjustment (AF) is performed.

Then, it is determined in Step S110 whether the first release button 36 is fully depressed, i.e., whether the switch 132 is turned ON. When it is determined in Step S110 that the first release button 36 is fully depressed, the shutter is opened to expose the film 110 in Step S112, the film 110 is wound in Step S114, and then this routine ends.

Conversely, when it is determined in Step S110 that the first release button 36 is not fully depressed, Step S111 is executed in which it is determined whether the first release button 36 is released. When the first release button 36 is not released, i.e., when the first release button 36 is kept at the partly depressed state, Step S110 is again executed.

When it is determined in Step S111 that the first release button 36 is released, or it is determined in Step S106 that the first release button 36 is not partly depressed, this routine ends without executing Steps S112 and S114.

In Step S118, it is determined whether the first infra-red light beam is received by the light receiving unit 32, i.e., whether the second release button 76 is partly depressed. When it is determined that the second release button 76 is partly depressed, a photometry operation, a distance measurement and an AF adjustment are performed in Step 120, similarly to Step S108. Then, Step S122 is executed in which it is determined whether the second infra-red light beam is received by the light receiving unit 32, i.e., whether the second release button 76 is fully depressed. When it is determined that the second release button 76 is fully depressed, an exposure is executed in Step S112, a film winding is executed in Step S114, and this routine then ends.

Conversely, when it is determined in Step S122 that the second release button 76 is not fully depressed, Step S123 is executed in which it is determined whether the second release button 76 is released. When the second release button 76 is not released, i.e., when the second release button 76 is kept at the partly depressed state, Step S122 is again executed.

When it is determined in Step S123 that the second release button 76 is released, or when it is determined in Step S118 that the second release button 76 is not partly depressed, this routine ends.

Thus, when the normal mode is set to the silver halide film camera 20, the camera 20 is operated by the first release button 36, and when the digital camera 60 is attached to the silver halide film camera 20 and the remote control mode is set, the camera 20 is operated by the second release button 76.

FIG. 7 shows a flowchart of a photographing process routine executed in the second system control circuit 156 of the digital camera 60.

The photographing process routine is started by supplying electric power to the digital camera 60. First, in Step S150, it is determined whether the silver halide film camera sensing circuit 199 senses that the digital camera 60 is attached to the silver halide film camera 20. When it is sensed that the digital camera 60 is attached to the silver halide film camera 20, Step S164 is executed, and when it is sensed that the digital camera 60 is not attached to the silver halide film camera 20, Step S152 is executed.

In Step S152, the normal mode is set. Then, in Step S154, it is determined whether the second release button 76 is partly depressed, i.e., whether the switch 192 is turned ON. When it is determined that the second release button 76 is partly depressed, Step S156 is executed, in which a photometry operation and a distance measurement are carried out, and thus an AF adjustment is performed.

It is determined in Step S158 whether the second release button 76 is fully depressed, i.e., whether the switch 194 is turned ON. When it is determined in Step S158 that the second release button 76 is fully depressed, the shutter is opened to expose the CCD 158 in Step S160, an image signal obtained through the CCD 158 is subjected to the image processes described above and is stored in the memory 180 in Step S162, and then this routine ends.

Conversely, when it is determined in Step S158 that the second release button 76 is not fully depressed, Step S159 is executed in which it is determined whether the second release button 76 is released. When the second release button 76 is not released, i.e., when the second release button 76 is kept at the partly depressed state, Step S158 is again executed.

When it is determined in Step S159 that the second release button 76 is released, or when it is determined in Step S154 that the second release button 76 is not partly depressed, this routine ends.

The remote control mode is set in the digital camera 60 in Step S164, and it is determined in Step S166 whether the second release button 76 is partly depressed. When it is determined that the second release button 76 is partly depressed, Step S168 is executed in which the first infra-red light beam is radiated from the infra-red light beam emitting diode 72, and then a photometry operation, a distance measurement and an AF adjustment are carried out in Step S170, similarly to Step S156. Then, in Step S172, it is determined whether the second release button 76 is fully depressed. When it is determined that the second release button 76 is fully depressed, Step S174 is executed in which the second infra-red light beam is radiated from the infra-red light beam emitting diode 72. Then, the shutter is opened to expose the CCD 158 in Step S160, an image signal obtained through the CCD 158 is stored in the memory 180 in Step S162, and then this routine ends. Note that, in the silver halide film camera 20, due to the second infra-red light beam, Steps S122, S112 and S114 are executed so that an object image is recorded on the film 110.

Conversely, when it is determined in Step S172 that the second release button 76 is not fully depressed, Step S173 is executed in which it is determined whether the second release button 76 is released. When the second release button 76 is not released, i.e., when the second release button 76 is kept at the partly depressed state, Step S172 is again executed.

When it is determined in Step S173 that the second release button 76 is released, or when it is determined in Step S166 that the second release button 76 is not partly depressed, this routine ends.

Thus, in the normal mode, by operating the second release button 76, a photographing operation is performed only in the digital camera 60, and in the remote control mode, by operating the second release button 76, photographing operations are simultaneously performed both in the digital camera 60 and in the silver halide film camera 20. Namely, in the remote control mode, a shutter timing of the silver halide film camera 20 at which the shutter is started to be opened by fully depressing the second release button 76 is synchronized with a shutter timing of the digital camera 60.

Figure 8A:
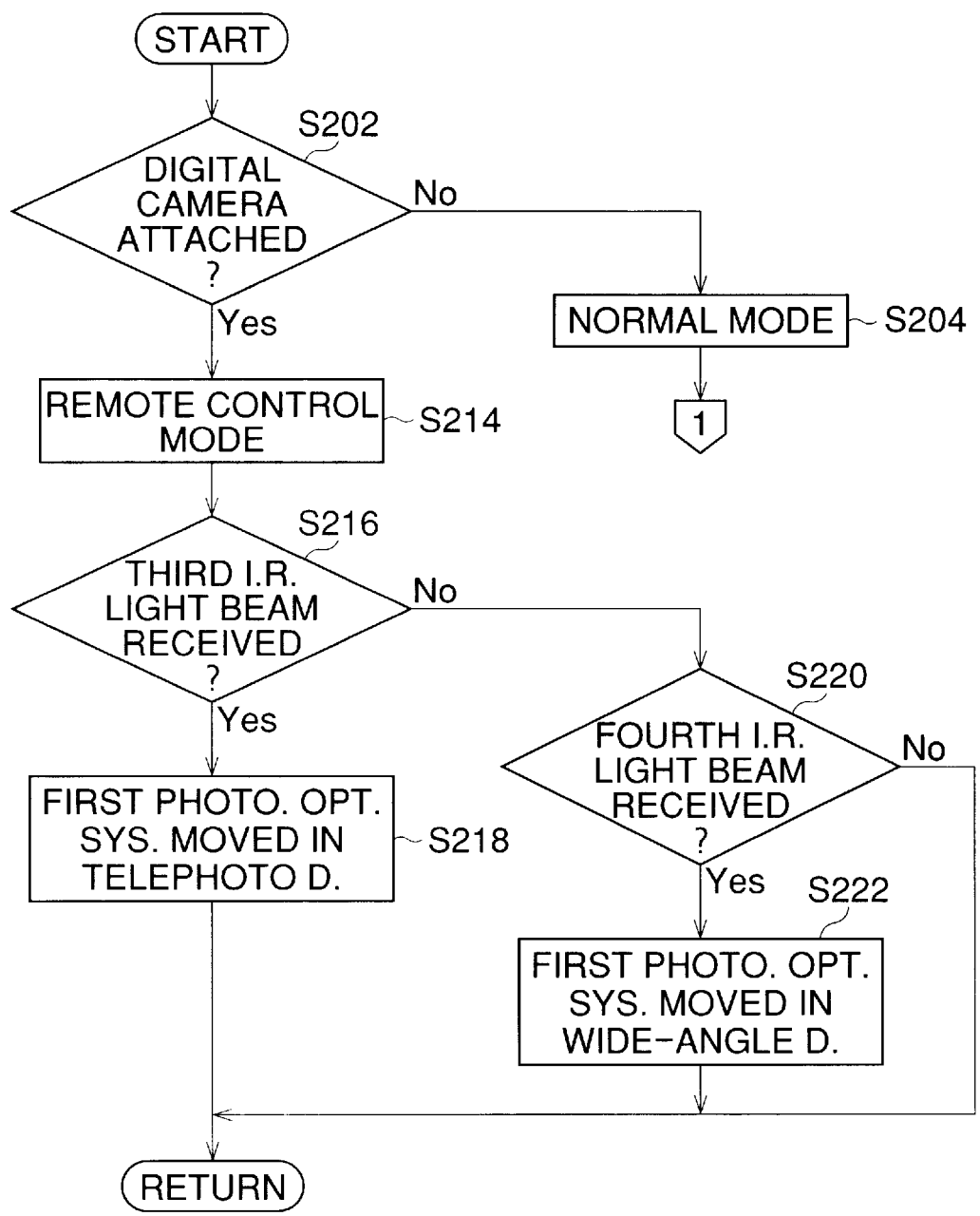
FIGS. 8A and 8B show a flowchart of a zooming process routine executed in the silver halide film camera.
Figure 8B:
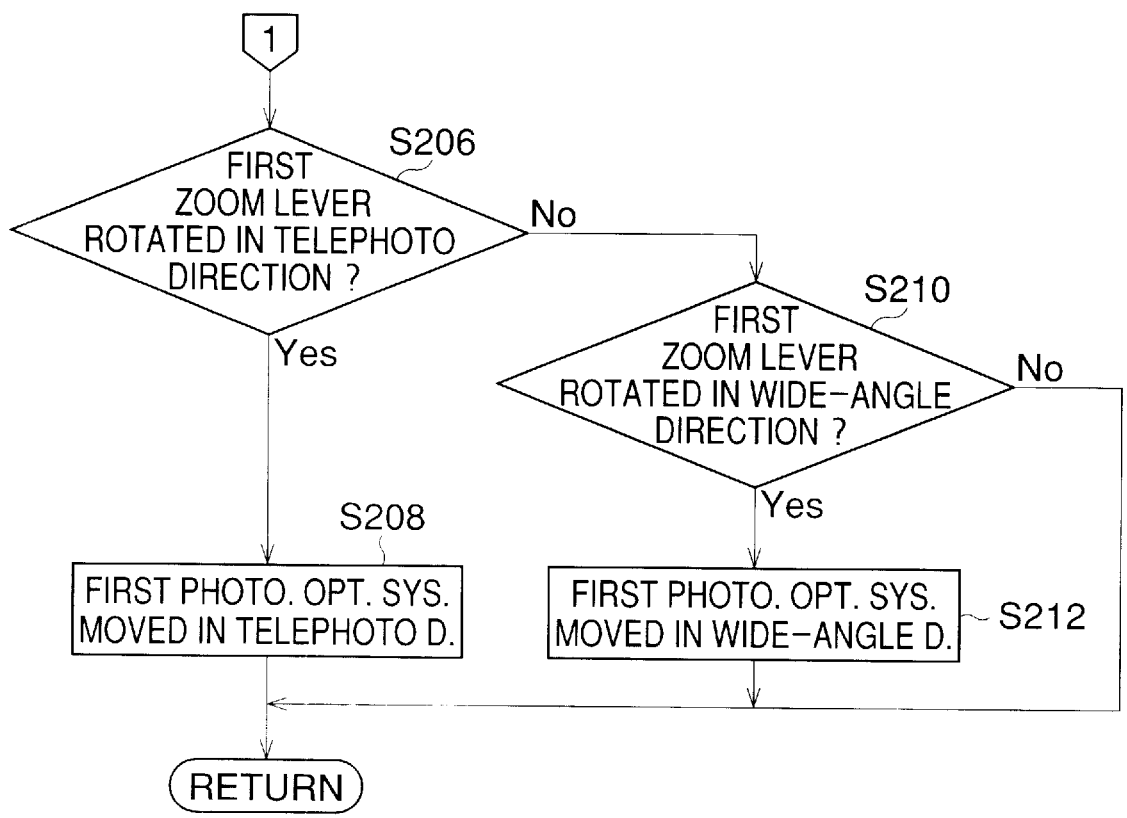

FIGS. 8A and 8B show a flowchart of a zooming process routine executed in the first system control circuit 108 of the silver halide film camera 20.

The zooming process routine is started by supplying an electric power to the silver halide film camera 20. In Step S202, it is determined whether the digital camera 60 is attached to the silver halide film camera 20. When it is sensed that the digital camera 60 is attached, Step S214 is executed in which the remote control mode is set, and when it is sensed that the digital camera 60 is not attached, Step S204 is executed in which the normal mode is set. In the remote control mode, the first zoom lever 38 is locked to become inoperable.

When the normal mode is set, it is sensed in Step S206 whether the first zoom lever 38 is rotated in the telephoto direction, i.e., whether the switch 134 is turned ON. When it is determined that the first zoom lever 38 is rotated in the telephoto direction, a zooming operation of the first photographing optical system 22 in the telephoto direction is carried out by the lens drive circuit 102 in Step S208, and then this routine ends.

When it is determined in Step S206 that the first zoom lever 38 is not rotated in the telephoto direction, it is determined in Step S210 whether the first zoom lever 38 is rotated in the wide-angle direction, i.e., whether the switch 136 is turned ON. When it is determined that the first zoom lever 38 is rotated in the wide-angle direction, a zooming operation of the first photographing optical system 22 in the wide-angle direction is carried out by the lens drive circuit 102 in Step S212, and thus this routine ends. Conversely, when the first zoom lever 38 is rotated in neither the telephoto direction nor the wide-angle direction, this routine ends without executing Steps S208 and S212.

When the remote control mode is set, a zooming operation of the first photographing optical system 22 in the telephoto direction is carried out in accordance with a sensing of the third infra-red light beam, and a zooming operation of the first photographing optical system 22 in the wide-angle direction is carried out in accordance with a sensing of the fourth infra-red light beam. Namely, it is determined in Step S216 whether the third infra-red light beam is received, and when it is determined that the third infra-red light beam is sensed, the zooming operation of the first photographing optical system 22 in the telephoto direction is performed in Step S218.

When it is determined in Step S216 that the third infra-red light beam is not received, Step S220 is executed in which it is determined whether the fourth infra-red light beam is received. When it is determined that the fourth infra-red light beam is received, the zooming operation of the first photographing optical system 22 in the wide-angle direction is performed in Step S222, and thus this routine ends. Conversely, when neither the third infra-red light beam nor the fourth infra-red light beam is received, the routine ends without executing Steps S218 and S222.

Figure 9A:
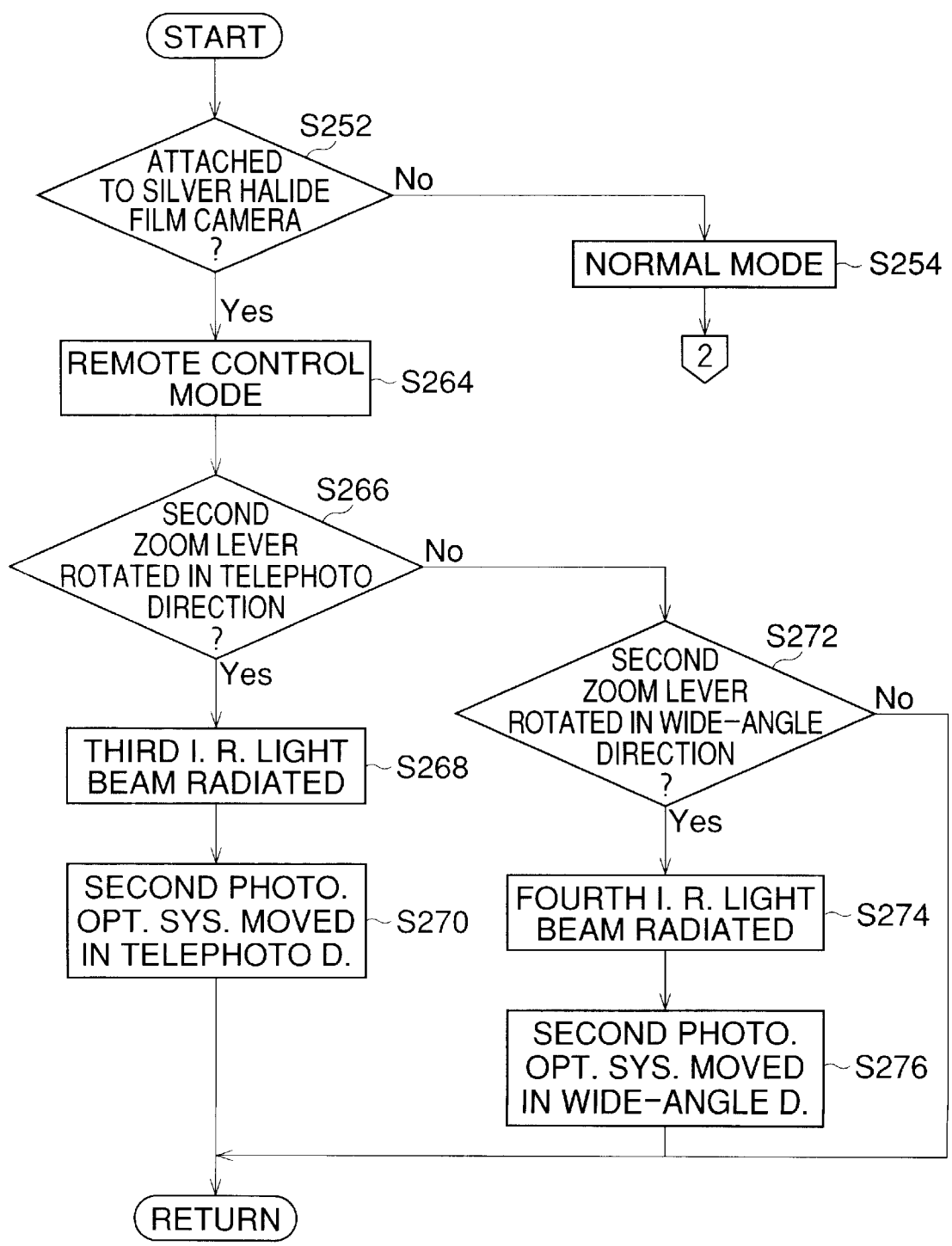
FIGS. 9A and 9B show a flowchart of a zooming process routine executed in the digital camera.
Figure 9B:
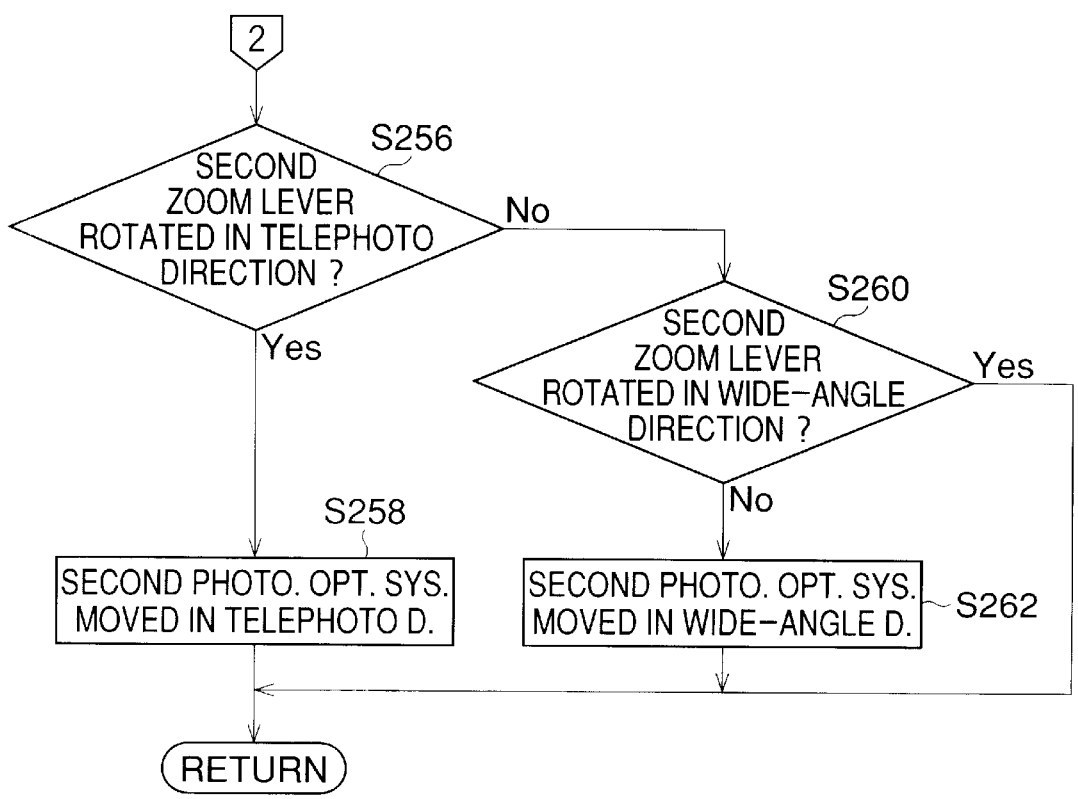

FIGS. 9A and 9B show a flowchart of a zooming process routine executed in the second system control circuit 156 of the digital camera 60.

The zooming process routine is started by supplying electric power to the digital camera 60. In Step S252, it is determined whether the digital camera 60 is attached to the silver halide film camera 20. When it is sensed that the digital camera 60 is attached to the silver halide film camera 20, Step S264 is executed in which the remote control mode is set, and when it is sensed that the digital camera 60 is not attached to the silver halide camera 20, Step S254 is executed in which the normal mode is set.

When the normal mode is set, it is sensed in Step S256 whether the second zoom lever 78 is rotated in the telephoto direction, i.e., whether the switch 196 is turned ON. When it is determined that the second zoom lever 78 is rotated in the telephoto direction, a zooming operation of the second photographing optical system 62 in the telephoto direction is carried out by the lens drive circuit 152 in Step S258, and thus this routine ends.

When it is determined in Step S256 that the second zoom lever 78 is not rotated in the telephoto direction, it is determined in Step S260 whether the second zoom lever 78 is rotated in the wide-angle direction, i.e., whether the switch 198 is turned ON. When it is determined that the second zoom lever 78 is rotated in the wide-angle direction, a zooming operation of the second photographing optical system 62 in the wide-angle direction is carried out by the lens drive circuit 152 in Step S262, and thus this routine ends. Conversely, when the second zoom lever 78 is rotated in neither the telephoto direction nor the wide-angle direction, this routine ends without executing Steps S258 and S262.

When the remote control mode is set, Step S266 is executed. When it is determined in Step S266 that the second zoom lever 78 is rotated in the telephoto direction, Step S268 is executed in which the third infra-red light beam is radiated from the infra-red light beam emitting diode 72, and Step S270 is then executed in which a zooming operation of the second photographing optical system 62 in the telephoto direction is performed, and thus this routine ends. Note that, in the silver halide film camera 20, due to the third infra-red light beam, Steps S216 and S218 are executed so that the first photographing optical system 22 is zoomed in the telephoto direction.

When it is determined in Step S266 that the second zoom lever 78 is not rotated in the telephoto direction, Step S272 is executed in which it is determined whether the second zoom lever 78 is rotated in a wide-angle direction. When it is determined that the second zoom lever 78 is rotated in a wide-angle direction, the fourth infra-red light beam is radiated from the infra-red light beam emitting diode 72 in Step S274, and a zooming operation of the second photographing optical system 62 in the wide-angle direction is performed in Step S276. Then, this routine ends. Note that, in the silver halide film camera 20, due to the fourth infra-red light beam, Steps S220 and S222 are executed so that the first photographing optical system 22 is zoomed in the wide-angle direction. Conversely, when the second zoom lever 78 is rotated in neither the telephoto direction nor the wide-angle direction, the routine ends without executing Steps S268, S270, S274 and S276.

As described above, in the normal mode, only a zooming operation of the second photographing optical system 62 is performed by the second zooming lever 78, and in the remote control mode, both zooming operations of the first and second photographing optical systems 22 and 62 are performed by the second zooming lever 78. Note that, in the remote control mode, the zooming operation of the first photographing optical system 22 by the second zoom lever 78 is synchronized with the zooming operation of the second photographing optical system 62.

In Steps S102 (FIG. 6) and S202 (FIG. 8A), it is sensed whether the digital camera 60 is attached to the silver halide camera 20 by the digital camera sensing circuit 140. At this time, even if the digital camera 60 is attached to the silver halide camera 20, when the power switch 190 is not turned ON, an indication on the LCD panel 40 is displayed, and it is deemed that the digital camera 60 is not attached to the silver halide film camera 20. Namely, the process goes from Steps S102 and S202 to Steps S104 and S204, respectively.

This operation is also applied to the sensing operations of the silver halide film camera 20 in Steps S150 (FIG. 7) and S252 (FIG. 9A). Namely, even if the digital camera 60 is attached to the silver halide film camera 20, when the power switch 128 is not turned ON, an indication on the monitor 82 is displayed, and it is deemed that the digital camera 60 is not attached to the silver halide film camera 20. Namely, the process goes from Steps S150 and S252 to Steps S152 and S254, respectively.

As described above, according to the embodiment, the light receiving unit, which is usually provided for the remote control of a silver halide film camera, is used as a device for receiving a signal output from a digital camera. Namely, it is not necessary to provide an electrical connection device between the silver halide film camera and the digital camera, and therefore, a common compact camera, for example, can be utilized as the silver halide film camera 20.

Figure 10:
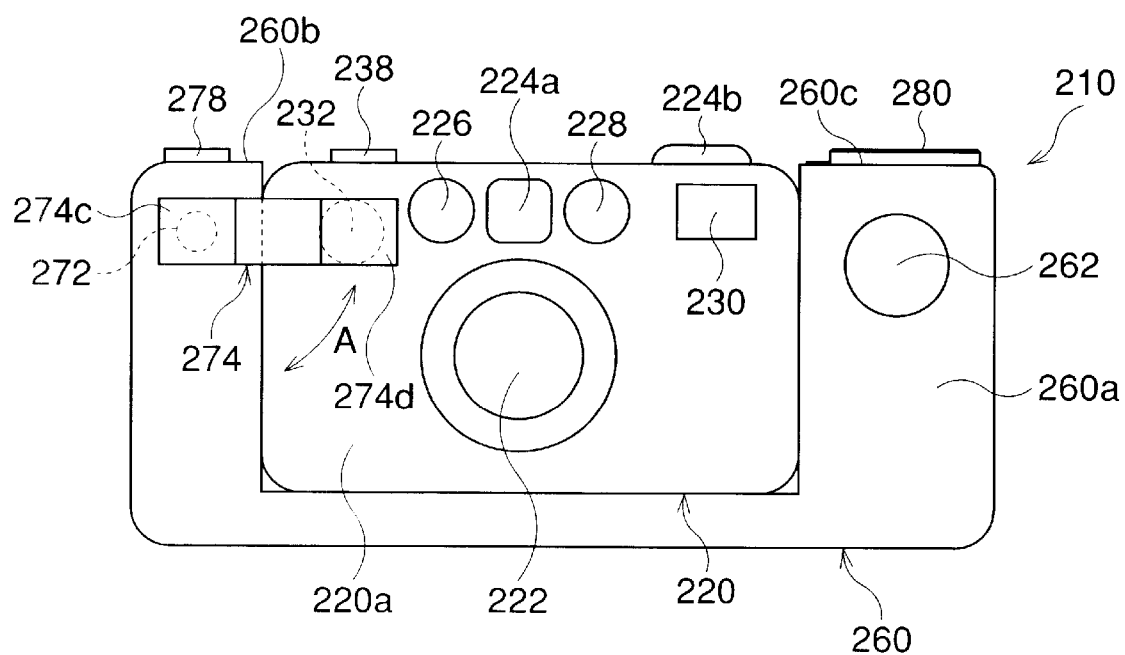
FIG. 10 is a front view showing a camera system of a second embodiment of the present invention, in which a prism is set to an operating position.
Figure 11:
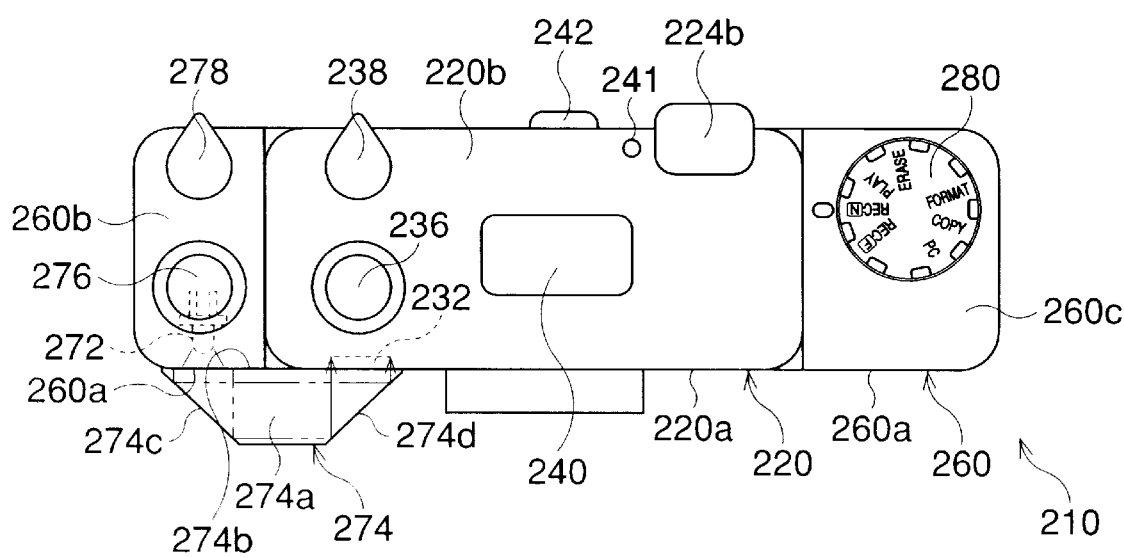
FIG. 11 is a plan view of the camera system shown in FIG. 10.
Figure 12:
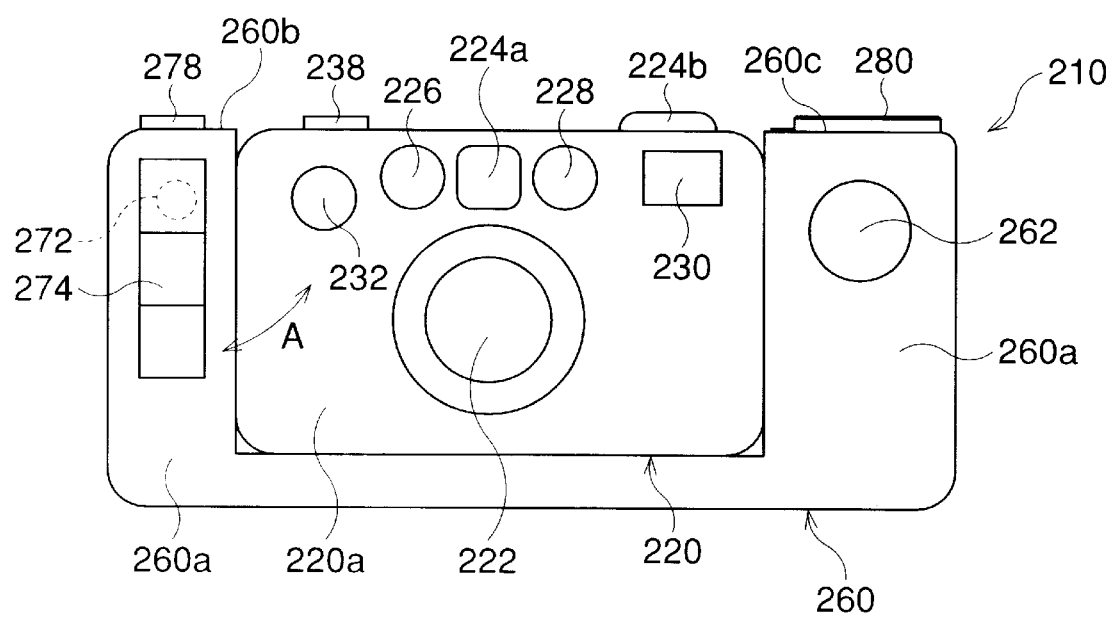
FIG. 12 is a front view of the camera system shown in FIG. 10, in which the prism is set to a nonoperating position.

FIGS. 10, 11 and 12 show a camera system 210 of a second embodiment of the present invention. FIGS. 10 and 12 are front views of the camera system 210, and FIG. 11 is a plan view of the camera system 210. The construction of the second embodiment is the same as that of the first embodiment, except for a transmitting unit, by which the operation control signal is optically transmitted from the digital camera to the silver halide film camera. In the second embodiment, a reference numeral of a component, corresponding to that of the first embodiment has "200" added, and a detailed explanation is omitted.

The transmitting unit has a reflecting member 274, an upper surface of which is a trapezoid as shown in FIG. 11. A side surface 274a, corresponding to the long side of the trapezoid, contacts front surfaces 220a and 260a of silver halide film camera 220 and digital camera 260. The reflecting member 274 is pivotally connected to a portion of the front surface 260a, corresponding to an infra-red light beam emitting diode 272, at one end portion of the side surface 274a, and is rotatable along an arrow A (see FIGS. 10 and 12). Two side surfaces 274c and 274d are inclined to the side surface 274b. An infra-red light beam, radiated by infra-red light beam emitting diode 272 from the camera system 210, is reflected through 90 degrees by the side surfaces 274c and 274d, respectively, to enter a light receiving unit 232, which is used for a remote control of the silver halide film camera 220.

When the silver halide film camera 220 is controlled by the digital camera 260, the reflecting member 274 is positioned at a position shown in FIG. 10, in which the longitudinal direction thereof is parallel to upper surface 220b. When the digital camera 260 is attached to or detached from the silver halide film camera 220, the reflecting member 274 is retracted to a position as shown in FIG. 12, in which the longitudinal direction thereof aligns perpendicularly to upper surface 260b along the front surface 260a of the digital camera 260.

Thus, in the second embodiment, since light receiving unit 232, which is provided for a remote control, is used for receiving an infra-red light beam output from the digital camera 260, a photographing operation and a zooming operation of the silver halide film camera 220 can be synchronized with those of the digital camera 260, while maintaining a simple construction, without resorting to electrically interconnecting the silver halide film camera 220 and the digital camera 260. Further, in the second embodiment, the reflecting member 274 covers the infra-red light beam emitting diode 272 and the light receiving unit 232, which enables secure transmission of an infra-red light beam from the digital camera 260 to the silver halide film camera 220.

Figure 13:
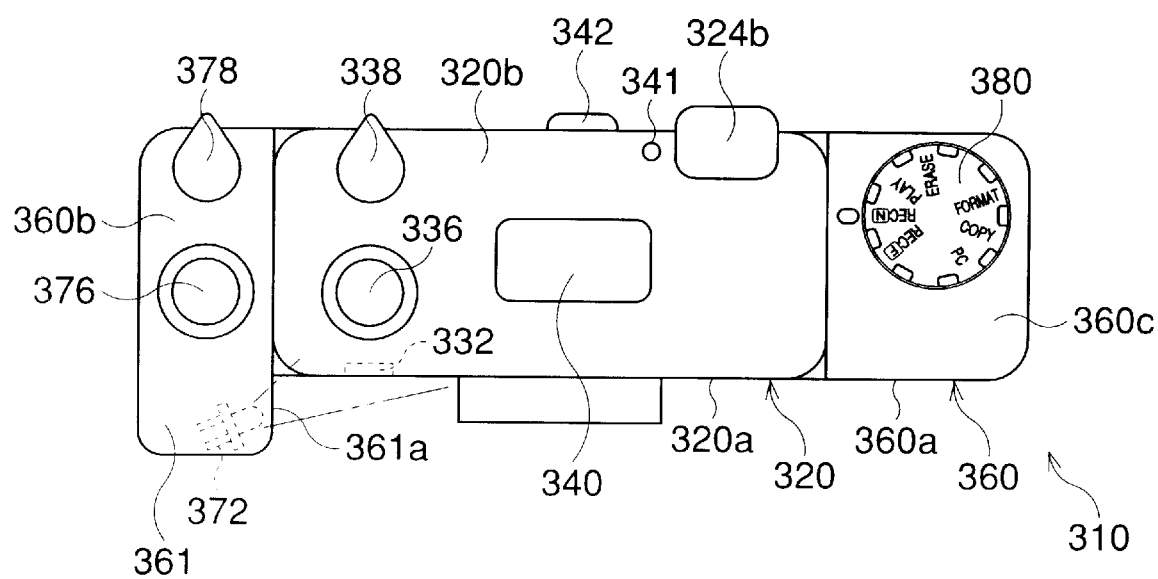
FIG. 13 is a plan view showing a camera system of a third embodiment of the present invention.

FIG. 13 shows a camera system of a third embodiment of the present invention. The construction of the third embodiment is the same as that of the first embodiment, except for a transmitting unit. In the third embodiment, a reference numeral of a component, corresponding to that of the first embodiment has "300" added, and a detailed explanation is omitted.

In the third embodiment, a left portion 361 of a digital camera 360 projects forward in comparison with a front surface 360a of the digital camera 360. An infra-red light beam emitting diode 372 is housed in the left portion 361, and obliquely faces a front surface 320a of silver halide film camera 320. An infra-red light beam radiated by the infra-red light beam emitting diode 372 directly enters a light receiving unit 332 from a side surface 361a of the digital camera 360.

In the third embodiment, similarly to the first and second embodiments, since the light receiving unit 332, which is provided for a remote control, is used for receiving an infra-red light beam output from the digital camera 360, a photographing operation and a zooming operation of the silver halide film camera 320 can be synchronized with those of the digital camera 360, while maintaining a simple construction, without resorting to electrically interconnecting the silver halide film camera 320 and the digital camera 360.

Figure 14:
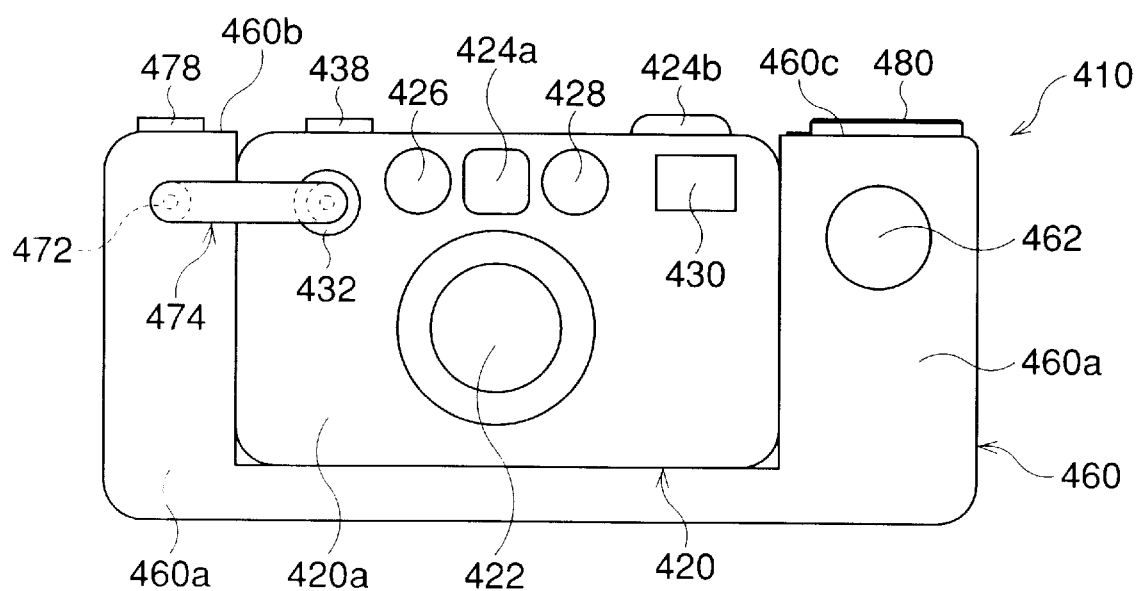
FIG. 14 is a front view showing a camera system of a fourth embodiment of the present invention.
Figure 15:
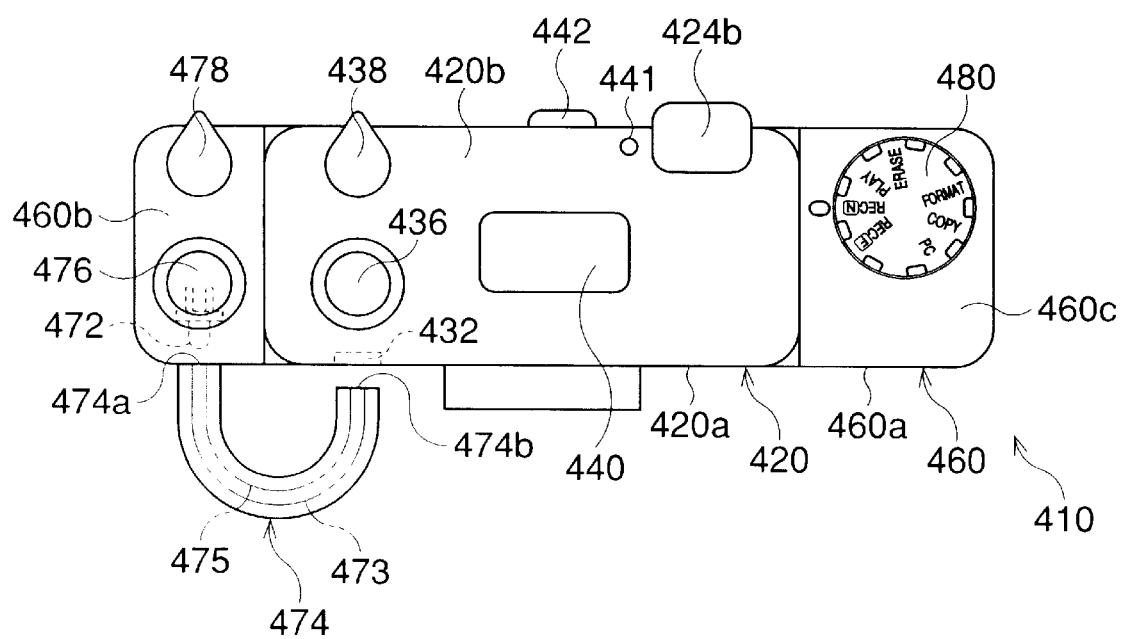
FIG. 15 is a plan view of the camera system shown in FIG. 14.

FIGS. 14 and 15 show a camera system of a fourth embodiment of the present invention. The construction of the fourth embodiment is the same as that of the first embodiment, except for a transmitting unit. In the fourth embodiment, a reference numeral of a component, corresponding to that of the first embodiment has "400" added, and a detailed explanation is omitted.

A cable 474 has a flexible tube 473 and an optical fiber 475 provided in the tube 473. One end portion 474a of the cable 474 is positioned at a front surface 460a of a digital camera 460 to face an infra-red light beam emitting diode 472. The cable 474 is bent in a U-shape, so that another end portion of the cable 474 faces a light receiving unit 432, which is provided for a remote control.

In the fourth embodiment, similarly to the first, second and third embodiments, since light receiving unit 432, which is provided for a remote control, is used for receiving an infra-red light beam output from digital camera 460, a photographing operation and a zooming operation of the silver halide film camera 420 can be synchronized with those of the digital camera 460, while maintaining a simple construction, without resorting to electrically interconnecting the silver halide film camera 420 and the digital camera 460. Further, due to the cable 474, a transmission of the infra-red light beam between the infra-red light beam emitting diode 472 and the light receiving unit 432 is surely carried out.

Although the embodiments of the present invention have been described herein with reference to the accompanying drawings, obviously many modifications and changes may be made by those skilled in this art without departing from the scope of the invention.

The present disclosure relates to subject matter contained in Japanese patent application no. 10-172719 (filed on Jun. 19, 1998) which is expressly incorporated herein, by reference, in its entirety.

What is claimed is:

1. A camera system by which an object image can be recorded on a silver halide film and in an electronic recording medium, said camera system comprising:

a silver halide film camera that has a film recording device to record said object image on said silver halide film, and a signal receiving device, which receives a remote control signal output by a remote controller, said silver halide film camera being controllable by said remote control signal; and a digital camera that has a digital recording device to electronically record said object image in said electronic recording medium, and a signal output device that outputs an operation control signal by which said silver halide film camera is controlled, when said digital camera is attached to said silver halide film camera;

wherein, said silver halide film camera is controllable by one of said remote control signal and said operation control signal, each being receivable by said signal receiving device of said silver halide film camera.

2. The camera system according to claim 1, said digital camera having a recess, said digital camera being attached to said silver halide film camera when said silver halide camera is mounted in said recess.

3. A camera system according to claim 1, wherein said signal output device comprises an infra-red light beam emitting diode that radiates an infra-red light beam corresponding to an operation which is performed by said silver halide film camera, and said signal receiving device comprises a light receiving element that receives said infra-red light beam.

4. A camera system according to claim 3, wherein said digital camera comprises a transmitting unit that transmits said infra-red light beam from said infra-red light beam emitting diode to said light receiving element.

5. A camera system according to claim 4, wherein said transmitting unit comprises a prism that reflects said infra-red light beam.

6. A camera system according to claim 4, wherein said transmitting unit comprises a reflecting member that reflects said infra-red light beam.

7. A camera system according to claim 4, wherein said transmitting unit comprises an optical fiber that transmits said infra-red light beam.

8. A camera system according to claim 1, wherein said digital camera comprises a photographing operation start unit that is manually operated to start a photometry operation and a distance measurement of said digital camera, and said operation control signal includes a first signal indicating said manually operated start of said photographing operation start unit.

9. A camera system according to claim 8, wherein, when said digital camera is attached to said silver halide film camera, a photometry operation and a distance measurement start in said silver halide film camera based on said first signal, simultaneously with said start of said photometry operation and said distance measurement in said digital camera.

10. A camera system according to claim 1, wherein said digital camera comprises a digital record start unit that is manually operated to start a photographing operation of said digital camera, and said operation control signal includes a second signal indicating said manually operated start of said digital record start unit.

11. A camera system according to claim 10, wherein, when said digital camera is attached to said silver halide film camera, a recording operation starts in said film recording device based on said second signal, simultaneously with a start of a recording operation in said digital recording device.

12. A camera system according to claim 1, wherein said digital camera comprises a photographing optical system and a digital camera zooming unit that changes a first magnification of said image of said photographing optical system, and said operation control signal includes a third signal indicating said digital camera zooming unit is operated to increase said first magnification of said image, and a fourth signal indicating said digital camera zooming unit is operated to decrease said first magnification of said image.

13. A camera system according to claim 12, wherein said silver halide film camera comprises a photographing optical system, and when said digital camera is attached to said silver halide film camera, a second magnification of said image of said photographing optical system is changeable based on said third and fourth signals, simultaneously with a change of said first magnification of said image in said digital recording device.

14. The camera system according to claim 1, said silver halide film camera having a surface from which a photographing lens projects, said digital camera having a surface from which a lens projects, said signal receiving device having a signal receiving portion, on said surface of said silver halide film camera, said signal output device having an output portion on said surface of said digital camera.

15. The camera system according to claim 1, said digital camera having a recess, said digital camera being attached to said silver halide film camera when said silver halide camera is mounted in said recess.

16. The camera system according to claim 1, said silver halide film camera having a surface from which a photographing lens projects, said digital camera having a surface from which a lens projects, said signal receiving device having a signal receiving portion, on said surface of said silver halide film camera, said signal output device having an output portion on said surface of said digital camera.

17. A digital camera detachably attachable to a silver halide film camera in which an object image is recordable on a silver halide film, said digital camera comprising:

a body having a recess within which a silver film camera is receivable;

a digital recording device that electronically records said object image in an electronic recording medium receivable in said digital camera; and a signal output device that optically transmits a control signal to said silver halide film camera, when said silver halide film camera is received in said recess so that said object imager is recorded in said silver halide film simultaneously with an operation of said digital recording device.

* * * * *